US011859515B2

(12) United States Patent
Nakano et al.

(10) Patent No.: US 11,859,515 B2
(45) Date of Patent: Jan. 2, 2024

(54) GAS TURBINE ENGINES WITH IMPROVED GUIDE VANE CONFIGURATIONS

(71) Applicant: General Electric Company, Schenectady, NY (US)

(72) Inventors: Tsuguji Nakano, West Chester, OH (US); Darek Zatorski, Fort Wright, KY (US); Andrew Breeze-Stringfellow, Montgomery, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/686,843

(22) Filed: Mar. 4, 2022

(65) Prior Publication Data

US 2023/0279779 A1 Sep. 7, 2023

(51) Int. Cl.

*F01D 9/04* (2006.01)
*F01D 25/28* (2006.01)
*F01D 9/02* (2006.01)
*F01D 5/14* (2006.01)

(52) U.S. Cl.

CPC ............. *F01D 9/041* (2013.01); *F01D 5/145* (2013.01); *F01D 9/02* (2013.01); *F01D 9/04* (2013.01); *F01D 25/28* (2013.01); *F05D 2240/126* (2013.01); *F05D 2240/129* (2013.01)

(58) Field of Classification Search

CPC . F01D 9/041; F01D 5/145; F01D 9/02; F01D 9/04; F01D 25/28; F05D 2240/126; F05D 2240/129

See application file for complete search history.

(56) References Cited

U.S. PATENT DOCUMENTS 3,169,747 A * 2/1965 Glenfield .............. F04D 29/666 415/161
4,989,406 A * 2/1991 Vdoviak ............... F01D 25/162 415/209.1
5,056,738 A 10/1991 Mercer et al.

(Continued)

FOREIGN PATENT DOCUMENTS

FR 3129375 5/2023
FR 3129428 5/2023

(Continued)

OTHER PUBLICATIONS

French Application No. FR2112278, Filed Nov. 19, 2021, Title: Module for Assembling a Fan Blade of a Turbomachine, (Ref. B-024469).

(Continued)

*Primary Examiner* — Brian Christopher Delrue
(74) *Attorney, Agent, or Firm* — Fitch Even Tabin & Flannery LLP

(57) ABSTRACT

There is provided apparatuses and methods for a gas turbine engine. The embodiments include a core section with a flow path. The flow path includes a stator vane array having outlet vanes. Each outlet vane has a trailing edge. A strut has a leading edge that is upstream of the trailing edges. Alternatively, the flow path includes a stator vane array having inlet vanes. Each inlet vane has a leading edge. The strut has a trailing edge that is downstream of the leading edges. There also is increased spacing between adjacent vanes and rotor blades.

12 Claims, 16 Drawing Sheets

(56) References Cited

U.S. PATENT DOCUMENTS

| | | | | |
|---|---|---|---|---|
| 6,082,966 | A * | 7/2000 | Hall | F01D 25/162 415/209.1 |
| 6,843,059 | B2 | 1/2005 | Burrus et al. | |
| 6,905,303 | B2 | 6/2005 | Liu et al. | |
| 7,553,129 | B2 * | 6/2009 | Hoeger | F01D 9/041 415/209.1 |
| 8,757,965 | B2 * | 6/2014 | Baralon | F01D 25/162 415/209.1 |
| 9,062,559 | B2 | 6/2015 | Little | |
| 9,068,460 | B2 * | 6/2015 | Suciu | F01D 1/04 |
| 9,835,038 | B2 * | 12/2017 | Paradis | F01D 9/042 |
| 9,909,434 | B2 | 3/2018 | Tsifourdaris et al. | |
| 10,094,223 | B2 | 10/2018 | Yu et al. | |
| 10,364,827 | B2 | 7/2019 | Humhauser et al. | |
| 10,578,127 | B2 | 3/2020 | Weber et al. | |
| 10,669,881 | B2 * | 6/2020 | Breeze-Stringfellow | B64C 11/001 |
| 11,193,380 | B2 * | 12/2021 | Paradis | F01D 9/02 |
| 11,396,812 | B2 * | 7/2022 | Ramm | F01D 9/041 |
| 2011/0318172 | A1 * | 12/2011 | Hoeger | F01D 9/041 415/181 |
| 2018/0252113 | A1 * | 9/2018 | Northall | F01D 5/142 |
| 2018/0306041 | A1 * | 10/2018 | Peters | F01D 9/065 |

FOREIGN PATENT DOCUMENTS

| | | |
|---|---|---|
| FR | 3129432 | 5/2023 |
| FR | 3129436 | 5/2023 |
| FR | 3129690 | 6/2023 |
| FR | 3129970 | 6/2023 |
| FR | 3129972 | 6/2023 |
| FR | 3130313 | 6/2023 |
| FR | 3130323 | 6/2023 |
| FR | 3130747 | 6/2023 |
| FR | 3130874 | 6/2023 |
| FR | 3130875 | 6/2023 |
| FR | 3130877 | 6/2023 |
| FR | 3130879 | 6/2023 |
| FR | 3130894 | 6/2023 |
| FR | 3130895 | 6/2023 |
| FR | 3130896 | 6/2023 |
| FR | 3130897 | 6/2023 |
| FR | 3132279 | 8/2023 |
| FR | 3132729 | 8/2023 |
| FR | 3132743 | 8/2023 |
| FR | 3133367 | 9/2023 |
| FR | 3133368 | 9/2023 |

OTHER PUBLICATIONS

French Application No. FR2109526, Filed Sep. 10, 2021, Title: Flexibilities in a geared gas turbine engine, (Ref. B-024242).
French Application No. FR2109530, Filed Sep. 10, 2021, Title: Flexibilities in a geared gas turbine engine, (Ref. B-024243).
French Application No. FR2109787, Filed Sep. 17, 2021, Title: Aircraft Turbine Engine With an Off-Axis Propeller, (Ref. B-024794).
French Application No. FR2112280, Filed Nov. 19, 2021, Title: Assembly With Variable Setting for a Fan of a Turbomachine, (Ref. B-024468).
French Application No. FR2112486, Filed Nov. 25, 2021, Title: Electric Energy Conversion and Transport System for the Internal Hybridization of an Aircraft Turbo-Engine, (Ref. B-025286).
French Application No. FR2112509, Filed Nov. 25, 2021, Title: Device for Pressurizing a Turbomachine Enclosure With a Curvic Coupling Passage, and Corresponding Turbomachine, (Ref. B-0250350).
French Application No. FR2112705, Filed Nov. 30, 2021, Title: Turbomachine Comprising a Lubrication Enclosure and a Speed Reducer, (Ref. B-024542).
French Application No. FR2113100, Filed Dec. 7, 2021, Title: Cooling-air distribution case, (Ref. B-024474).
French Application No. FR2113361, Filed Dec. 13, 2021, Title: Turbomachine for an Aircraft Comprising an Electric Machine, (Ref. B-025039).
French Application No. FR2113552, Filed Dec. 15, 2021, Title: Method for managing the torque of a turbomachine, (Ref. B-025059).
French Application No. FR2113845, Filed Dec. 17, 2021, Title: Aircraft Turbomachine, (Ref. B-025396).
French Application No. FR2113847, Filed Dec. 17, 2021, Title: Aircraft Turbomachine, (Ref. B-025189).
French Application No. FR2113949, Filed Dec. 20, 2021, Title: Turbomachine Module Equipped With a Pitch Change System and a Fluid Transfer Device, (Ref. B-024662).
French Application No. FR2113951, Filed Dec. 20, 2021, Title: Turbomachine Module Equipped With Variable Pitch Vanes and an Annular Interface Shroud, (Ref. B-023792).
French Application No. FR2113952, Filed Dec. 20, 2021, Title: Turbomachine Module Equipped With Variable Pitch Vanes and Oil Transfer Device, (Ref. B-023793).
French Application No. FR2113953, Filed Dec. 20, 2021, Title: Turbomachine Module Equipped With a Pitch Change System and a Fluid Transfer Device With Blind Sleeving, (Ref. B-024657).
French Application No. FR2113966, Filed Dec. 20, 2021, Title: Fluid Transfer Device With Hydraulic and Mechanical Connection Means, (Ref. B-024661).
French Application No. FR2114236, Filed Dec. 22, 2021, Title: Turbine Engine Subassembly Including a Gooseneck With an Improved Configuration and Turbine Engine Including a Subassembly of This Type (Ref. B-024601).
French Application No. FR2114272, Filed Dec. 22, 2021, Title: Aircraft Turbine Engine Comprising Blade Pitch Control Using Local Pressure Measurements, (Ref. B-024494).
French Application No. FR2200883, Filed Feb. 1, 2022, Title: Method for managing the torque of a turbomachine, (Ref. B-025105).
French Application No. FR2201260, Filed Feb. 14, 2022, Title: Propulsion unit for aircraft comprising a gas turbine engine and an electrical machine mounted in an enclosure with a cooling system comprising a main coupling member, method for using such a unit, (Ref. B-025173).
French Application No. FR2201266, Filed Feb. 14, 2022, Title: Gas turbine engine assembly comprising a housing with half-shells bearing variable pitch inlet stator vanes, (Ref. B-024190).

* cited by examiner

GAS TURBINE ENGINES WITH IMPROVED GUIDE VANE CONFIGURATIONS

TECHNICAL FIELD

The present disclosure relates generally to gas turbine engines and, more specifically, to gas turbine engines with improved guide vane configurations.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air using one or more fuel nozzles within the combustion section and burned to provide combustion gases. The combustion gases are routed from the combustion section to the turbine section. The flow of combustion gasses through the turbine section drives the turbine section and is then routed through the exhaust section to atmosphere.

Typical gas turbine engines include guide vanes in the compressor section. More specifically, the compressor section includes a low-pressure compressor section followed by a high compressor section. The low and high compressor sections include guide vanes to control flow through the compressor sections. For instance, the end of the low compressor section may include an annular array of outlet guide vanes, and the start of the high compressor section may include a annular array of inlet guide vanes. The outlet guide vanes and the inlet guide vanes are typically positioned outside of the attachment location of struts that support the core of the gas turbine engine.

There is a desire to improve the location of the outlet guide vanes and the inlet guide vanes to improve the performance of the gas engine.

BRIEF DESCRIPTION OF THE DRAWINGS

Various needs are at least partially met through provision of the gas turbine engine with improved guide vane configurations described in the following detailed description, particularly when studied in conjunction with the drawings. A full and enabling disclosure of the aspects of the present description, including the best mode thereof, directed to one of ordinary skill in the art, is set forth in the specification, which refers to the appended figures, in which.

Figure 1:
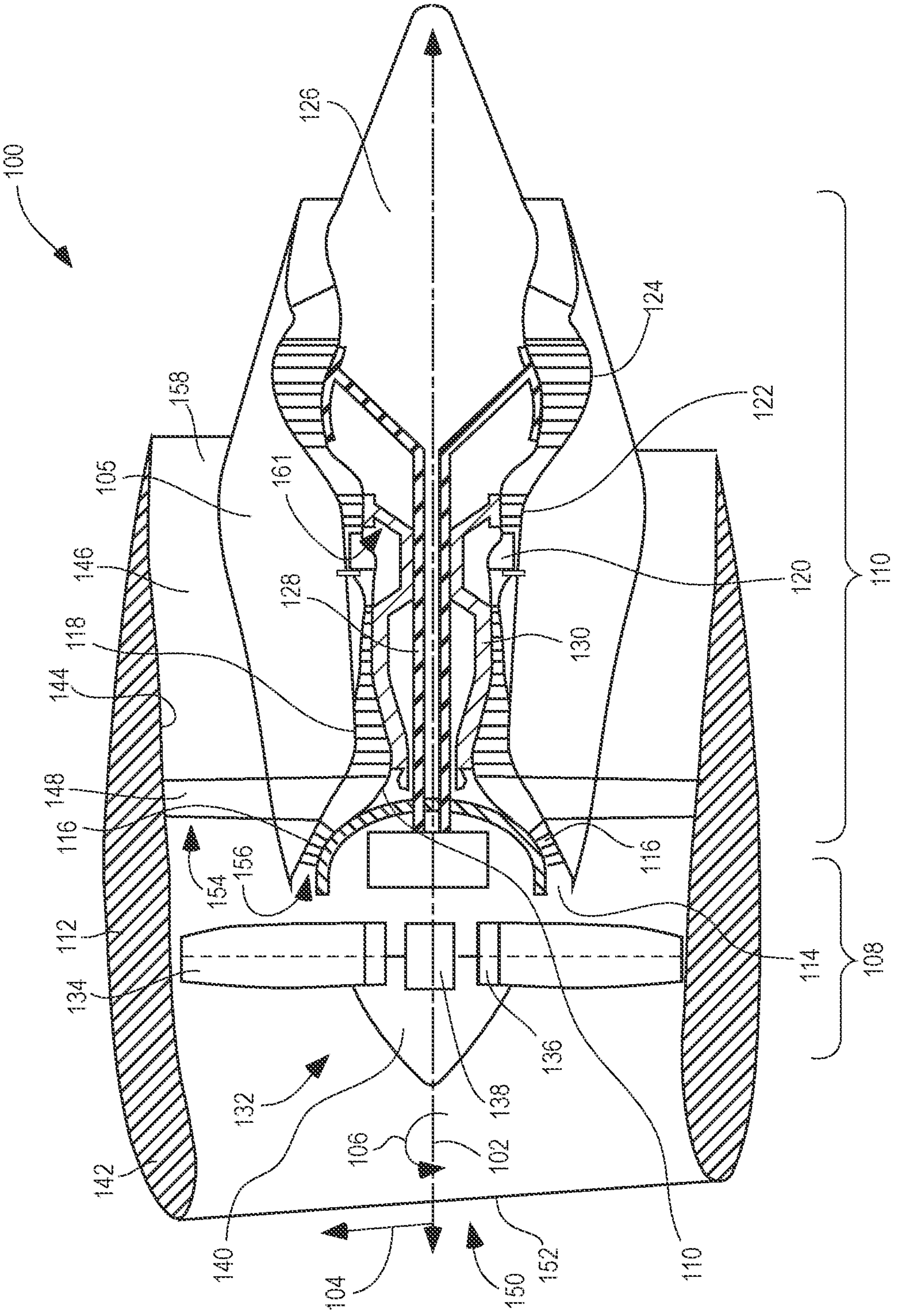
FIG. 1 is a cross-sectional view of a gas turbine engine in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present disclosure. Also, common, but well-understood elements that are useful or necessary in a commercially feasible embodiment, are often not depicted to facilitate a less obstructed view of these various embodiments of the present disclosure. Certain actions and/or steps may be described or depicted in a particular order of occurrence while those skilled in the art will understand that such specificity with respect to sequence is not actually required.

DETAILED DESCRIPTION

The following embodiments illustrate flow path designs that shorten an aircraft engine (e.g., its core) length and/or reduce aircraft engine noise, as well as provide other benefits. More specifically, embedding supports struts with inlet stator vanes and/or outlet stator vanes shortens the overall length of the aircraft engine. One or more benefits of shortening the aircraft engine is a reduction of engine weight and improved fuel efficiency. Further, increasing a distance between stator vanes and adjacent rotors without increasing an overall length of the aircraft engine mitigates noise, aeromechanical forcing, and stress. For instance, the designs of FIGS. 3-7 are illustrative examples of embodiments that either reduce noise of an engine due to increased spacing between stator vanes and rotors and/or shorten the length of the aircraft engine due to embedding struts with stator vanes. Further, another advantage of the following designs is the ability to achieve one or more of these benefits using the same length of current aircraft engines so to retrofit current aircraft engines and aircraft components. Other benefits might include better turbomachinery efficiencies due to lower stress and forcing sources and turbomachinery component efficiencies due to lower aero loading in vanes.

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

The terms "upstream" and "downstream" refer to the relative direction with respect to fluid flow in a fluid pathway. For example, "upstream" refers to the direction from which the fluid flows, and "downstream" refers to the direction to which the fluid flows.

The foregoing and other benefits may become clearer upon making a thorough review and study of the following detailed description. Referring now to the drawings, and in particular to FIG. 1, there is illustrated an exemplary gas turbine engine 100. The gas turbine engine 100 defines an axial direction 102, a radial direction 104, and a circumferential direction 106 (i.e., a direction extending about the axial direction A). The gas turbine engine 100 includes an outer casing 112 about a fan section 108 followed by a core section 110. The core section 110 includes an inner casing 105 that may be substantially tubular and that defines an annular inlet 114. The inner casing 105 encases, in the axial direction 102, a compressor section including a low-pressure compressor (LPC) 116 and a high-pressure compressor (HPC) 118, a combustion section 120, a turbine section including a high-pressure turbine (HPT) 122 and a low-pressure turbine (LPT) 124, and a jet exhaust nozzle section 126. A low pressure (LP) shaft 128 drivingly connects the LPC 116 to the LPT 124. A high pressure (HP) shaft 130 drivingly connects the HPC 118 to the 122 HPT.

The fan section 108 includes a fan 132 having a plurality of fan blades 134 extend in the radial direction 104 from a disc 136. The LPT 124 drives rotation of the fan 132. More specifically, the fan blades 134, the disc 136, and an actuation member 138 are rotatable together in the circumferential direction 106 by LP shaft 128 in a "direct drive" configuration. Accordingly, the LPT 124 rotates the fan 132 at the same rotational speed of the LPT 124.

A rotatable front hub 140 covers the disc 136 and is aerodynamically contoured to promote an airflow through the plurality of fan blades 134. Additionally, the fan section 108 includes an outer nacelle 142 that circumferentially surrounds the fan section 108 and a portion of the core section 110. More specifically, the nacelle 142 includes an inner wall 144 with a section that extends over the core section 110 to define a bypass airflow passage 146 therebetween. Additionally, the nacelle 142 is supported relative to the core section 110 by a plurality of circumferentially spaced struts 148 that extend in the radial direction 104 and are shaped as guide vanes.

During operation of the gas turbine engine 100, a volume of air 150 enters the gas turbine engine 100 through an associated inlet 152 of the nacelle 142. As the volume of air 150 passes the fan blades 134, a first portion of the air 154 flows into the bypass airflow passage 146, and a second portion of the air 156 flows into the LPC 116. The pressure of the second portion of air 156 is then increased as it flows through the HPC 118 and into the combustion section 120, where it is mixed with fuel and burned to provide combustion gases 161.

The combustion gases 161 flow through the HPT 122 where a portion of thermal and/or kinetic energy from the combustion gases 161 is extracted via sequential stages of HPT stator vanes that are coupled to an inner casing 105 and HPT rotor blades that are coupled to the HP shaft 130, thus causing the HP shaft 130 to rotate, which causes operation of the HPC 118. The combustion gases 161 then flow through the LPT 124 where a second portion of thermal and kinetic energy is extracted from the combustion gases 161 via sequential stages of LPT stator vanes that are coupled to the inner casing 105 and LPT rotor blades that are coupled to the LP shaft 128, thus causing the LP shaft 128 to rotate, which causes operation of the LPC and/or the fan 132.

The combustion gases 161 subsequently flow through the jet exhaust nozzle section 126 to provide propulsive thrust. Simultaneously, the pressure of the first portion of air 154 is substantially increased as the first portion of air 154 flows through the bypass airflow passage 146 before it is exhausted from a fan nozzle exhaust section 158, also providing propulsive thrust. The HPT 122, the LPT 124, and the jet exhaust nozzle section 126 at least partially define a hot gas path for routing the combustion gases 161 through core section 110.

It should be appreciated, however, that the exemplary gas turbine engine 100 depicted in FIG. 1 and described above is by way of example only, and that in other exemplary embodiments, the gas turbine engine 100 may have any other suitable configuration. For example, in other exemplary embodiments, the engine 100 may include any other suitable number of compressors, turbines and/or shaft. Additionally, the gas turbine engine 100 may not include each of the features described herein, or alternatively, may include one or more features not described herein. Additionally, although described as a "turbofan" gas turbine engine, in other embodiments the gas turbine engine may instead be configured as any other suitable ducted gas turbine engine.

Figure 2:
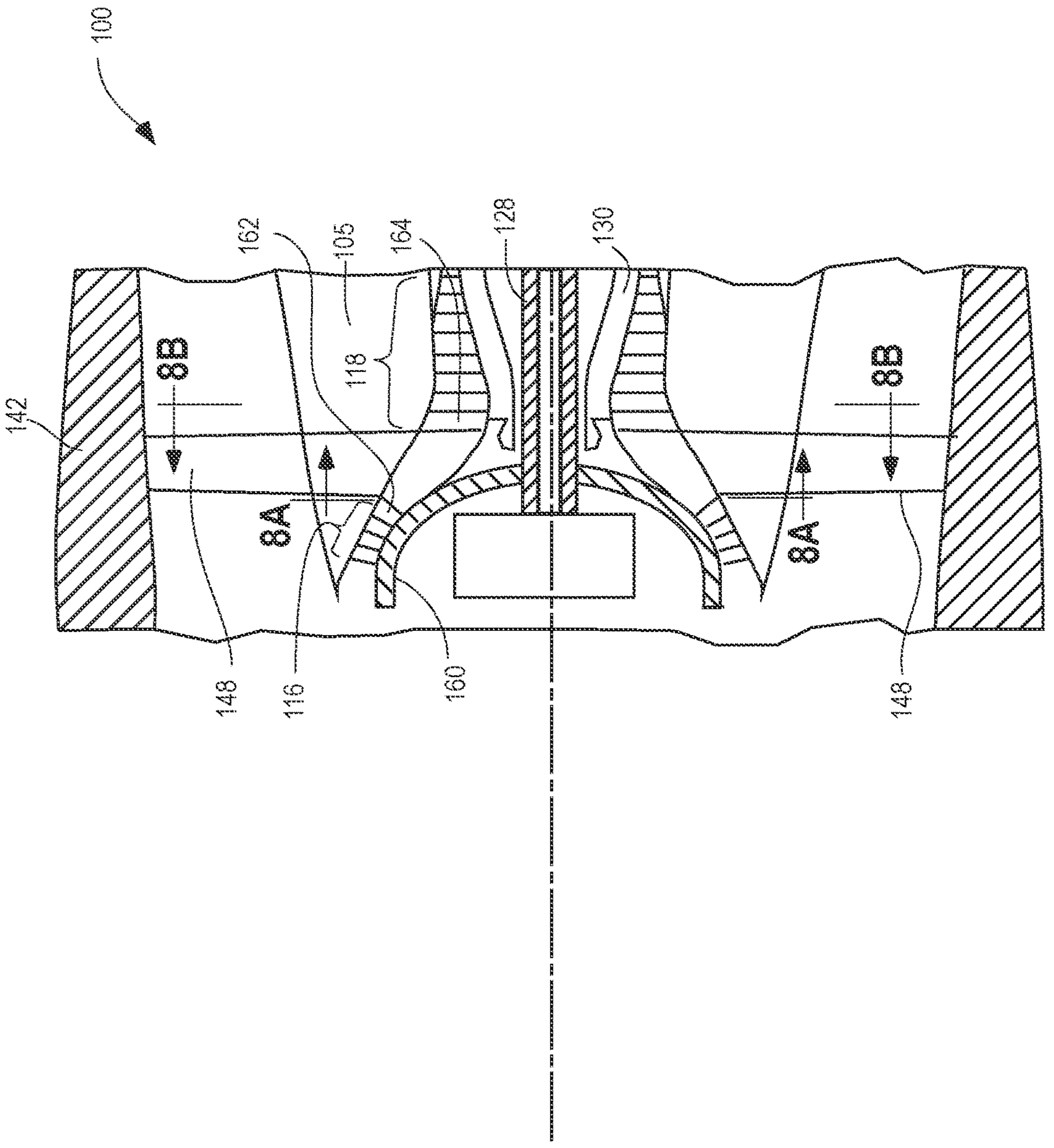
FIG. 2 is an enlarged cross-sectional view of a portion of the gas turbine engine of FIG. 1.
Figure 3:
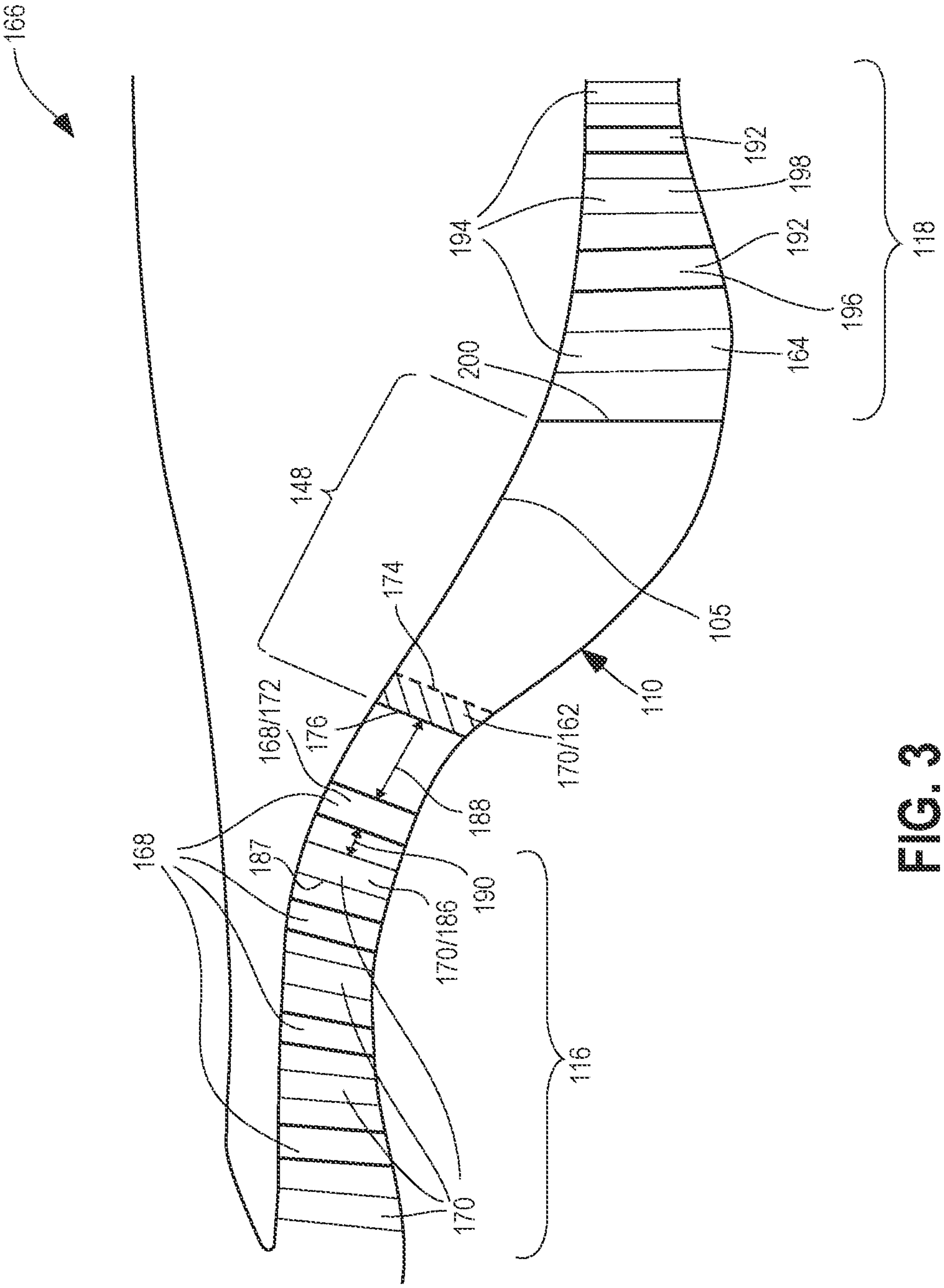
FIG. 3 is an enlarged cross-sectional view of a portion of an annular compressor flow path for use with the gas turbine engine of FIG. 1.

FIG. 2 is a schematic view of a portion of the gas turbine engine 100 showing a portion of the flow path for the core section 110. The flow path is bounded by the inner casing 105, a forward end 160 of the LP shaft 128, and the HP shaft 130. The flow path guides flow from the LPC 116 to the HPC 118. The struts 148 support the core section 110 along the flow path.

The LPC 116 includes a plurality of annular arrays of stator vanes and a plurality of annular arrays of rotor blades. The arrays of LPC stator vanes and LPC rotor blades alternate through the LPC 116, as explained further below. The LPC stator vanes extend from the inner casing 105 that is static, and the LPC rotor blades extend from the forward end 160 that rotates with the LP shaft 128. Similarly, the HPC 118 includes a plurality of annular arrays of stator vanes and a plurality of annular arrays of rotor blades. The arrays of HPC stator vanes and HPC rotor blades alternate through the HPC 118, as explained further below. The HPC stator vanes extend from the static inner casing 105, and the HPC rotor blades extend from the HP shaft 130.

At the downstream end of the LPC 116, there is the last array of LPC stator vanes, which may be referred to as the LPC outlet vanes (LPC-OV 162). Positioned at the upstream end of the HPC 118 is the first annular array of HP stator vanes, which may be referred to as the HPC inlet vanes (HPC-IV 164).

The following describes different configurations of the components of the LPC and the HPC, including the LPC-OV and the HPC-IV. The reference numbers used above will be used in describing the different configurations.

Referring to FIG. 3 and FIGS. 9A-9C, there is illustrated an alternate annular compression flow path 166. The alternate annular compression flow path 166 includes arrays of LP rotor blades 168 alternating with arrays of LP stator vanes 170. The most downstream array of LP rotator blades 168/172 is followed by the LPC-OV 170/162. Each of the LPC-OV 162 includes a trailing edge 174. Each strut 148 includes a leading edge 176. The leading edge 176 may be positioned upstream from the trailing edges 174 of the LPC-OV 162. Embedding the strut 148 with the LPC-OV 162 reduces the length of an engine.

Figure 9A:
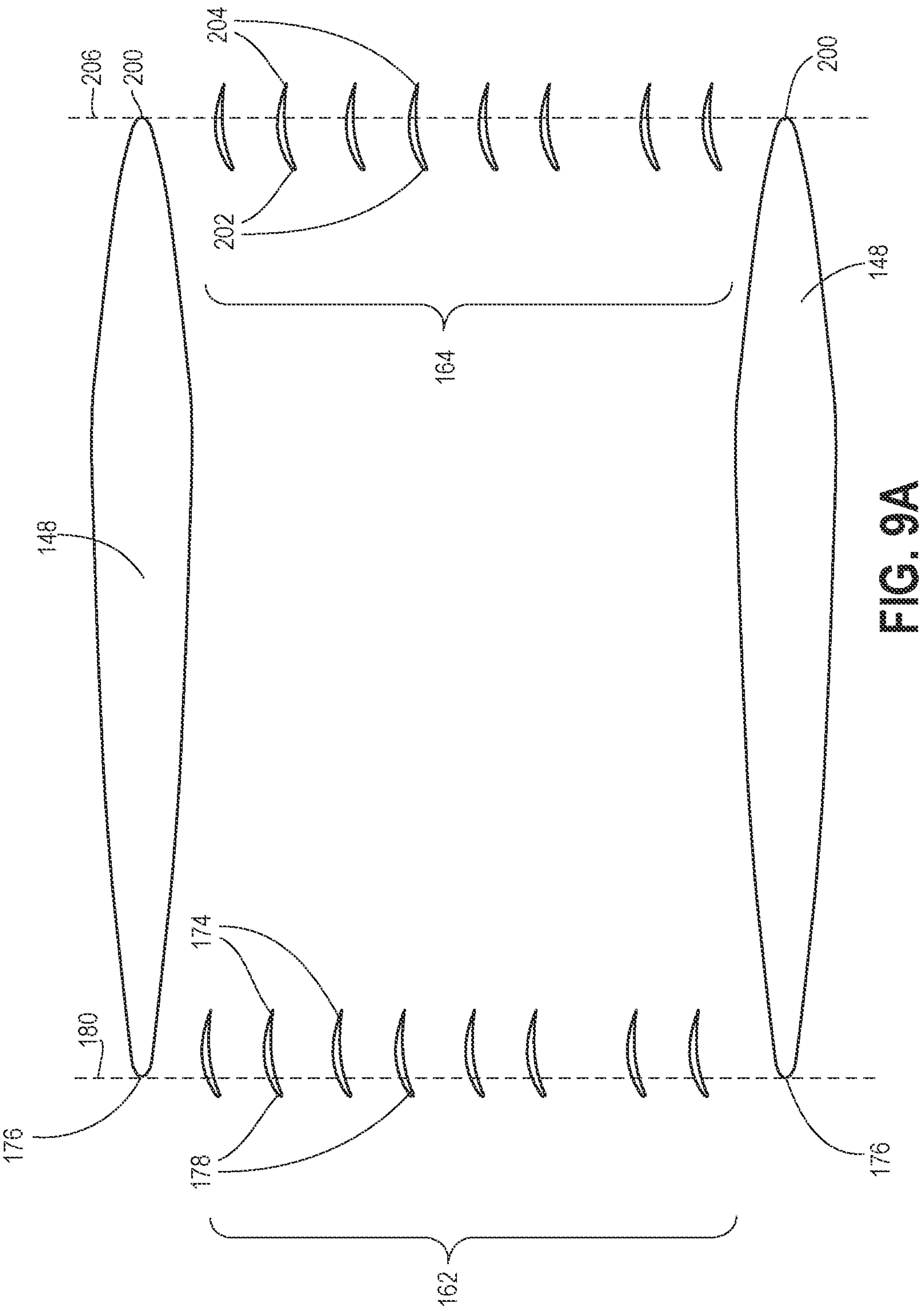
FIG. 9A is a schematic view of an arrangement of outlet guide vanes, inlet guide vanes, and struts for use with the gas turbine engine of FIG. 1.
Figure 9B:
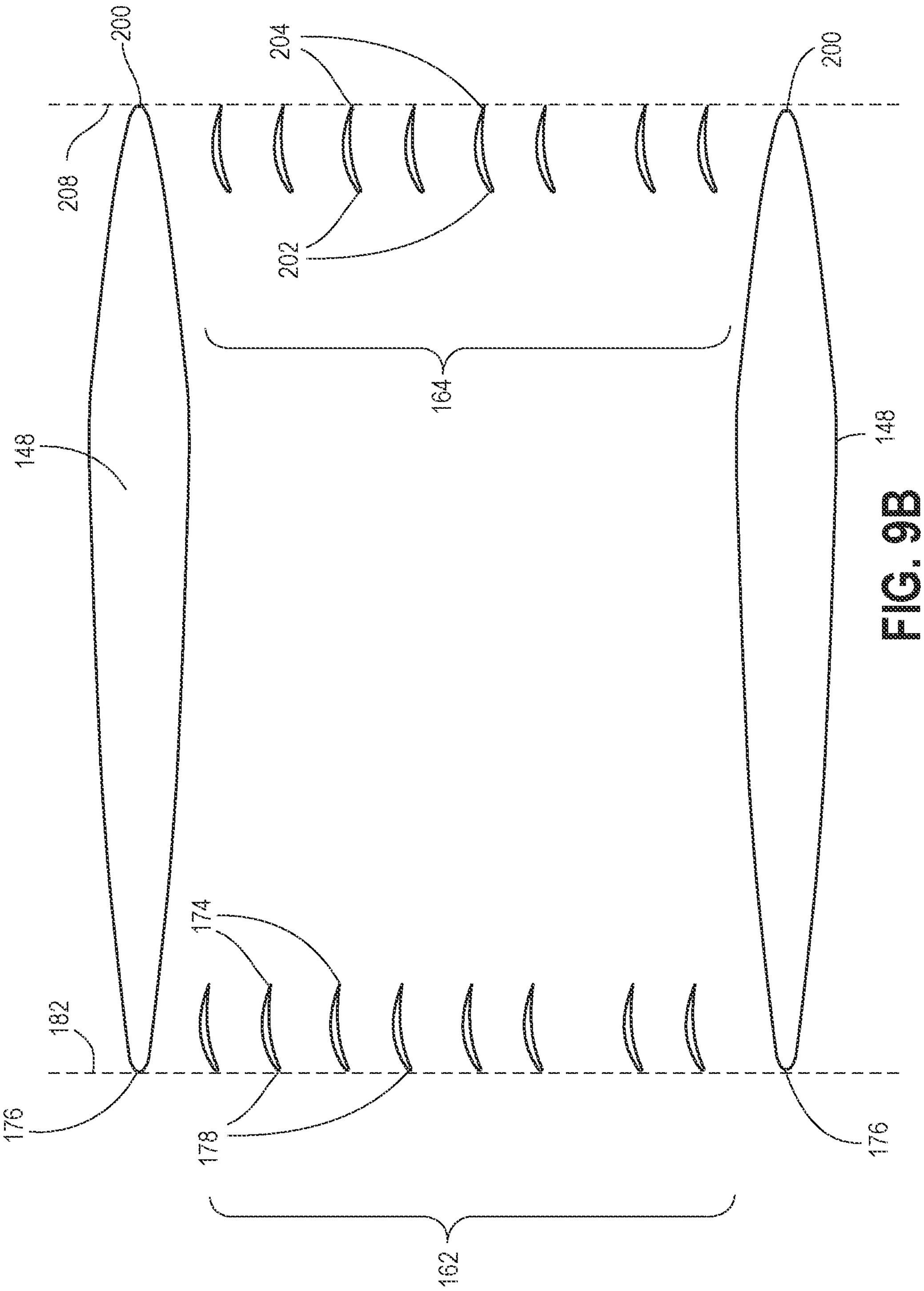
FIG. 9B is a schematic view of an arrangement of outlet guide vanes, inlet guide vanes, and struts for use with the gas turbine engine of FIG. 1.

More specifically, the strut leading edge 176 of each strut 148 may be disposed between a leading edge 178 and the trailing edge 174 of each of the LPC-OV 162, as shown in FIG. 9A (see reference line 180). Alternatively, the leading edge 176 of each strut 148 is substantially aligned with the leading edge 178 of each of the LPC-OV 162, as shown in FIG. 9B (see reference line 182). In another alternative, the strut leading edge 176 of each strut 148 is positioned upstream from the leading edge 178 of each of the LPC-OV 162, as shown in FIG. 9C (see reference line 184).

In some embodiments, the arrays of LPC stator vanes 170 includes a second to last array of LPC stator vanes 186 immediately upstream of the furthest downstream array of LPC rotor blades 168/172. The second to last array of LPC stator vanes 186 may have guide vanes, and each guide vane may have a guide vane trailing edge 187. In some embodiments, a first axial spacing 188 between the LPC-OV 162 and furthest downstream array of LPC rotor blades 172 is greater than a second axial spacing 190 between the second to last array of LPC stator vanes 186 and the furthest downstream array of LPC rotor blades 172. In some embodiments, the first axial spacing 188 is substantially equal to the second axial spacing 190. This spacing mitigates engine noise, aeromechanical forcing, and stress.

Figure 4:
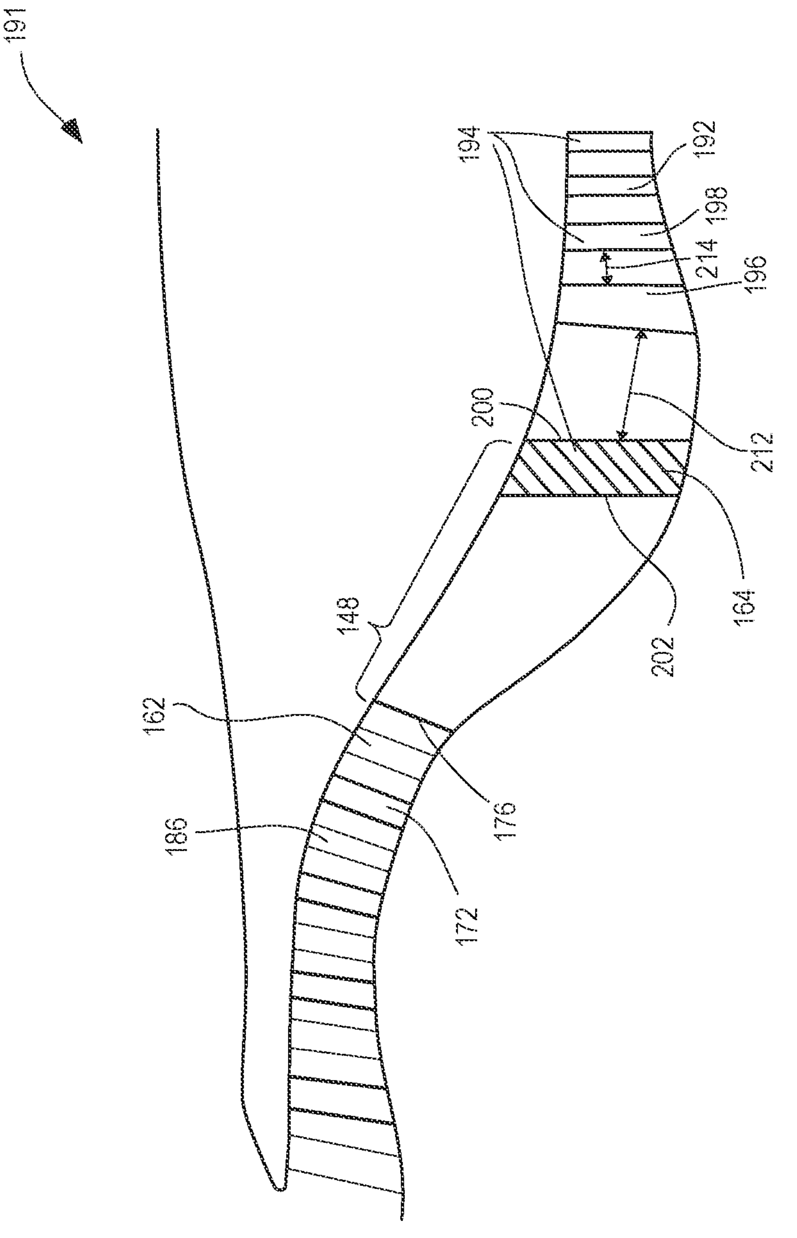
FIG. 4 is an enlarged cross-sectional view of a portion of another annular compressor flow path for use with the gas turbine engine of FIG. 1.

In FIG. 4, there is illustrated an alternate flow path 191. The alternate flow path 191 includes arrays of HPC rotor blades 192 alternating with arrays of HPC stator vanes 194. The arrays of HPC rotor blades 192 include a first array 196 (most upstream). The arrays of HPC stator vanes 194 include a first array (most upstream) (HPC-IV 164). The HPC-IV 164 is positioned upstream from the first array of HPC rotor blades 196. The arrays of HPC stator vanes 194 also includes a second most upstream array of HPC stator vanes 198. The second most upstream array of HPC stator vanes 198 is positioned downstream from the first array of HPC rotor blades 196.

Figure 9C:
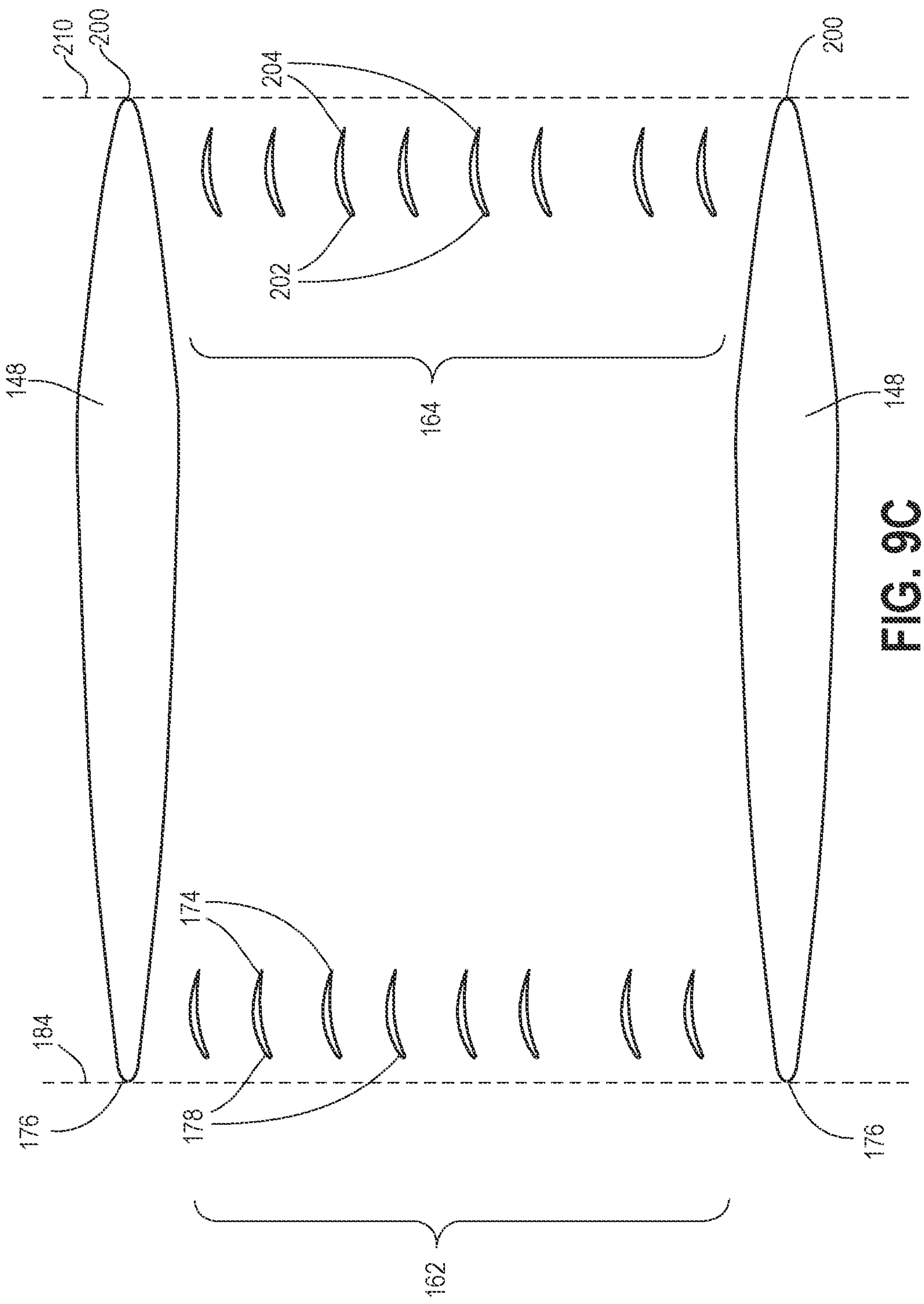
FIG. 9C is a schematic view of an arrangement of outlet guide vanes, inlet guide vanes, and struts for use with the gas turbine engine of FIG. 1.

In some embodiments, a strut trailing edge 200 of each strut 148 is positioned downstream from a leading edge 202 of the HPC-IV 164, as shown in FIGS. 4 and 9A-9C. More specifically, the strut trailing edge 200 of each strut 148 may be positioned between the leading edge 202 and a trailing edge 204 of the HPC-IV 164, as shown in FIG. 9A (see reference line 206). Alternatively, the strut trailing edge 200 of each strut 148 may be substantially aligned with the trailing edge 204 of the HPC-IV 164, as shown in FIG. 9B (see reference line 208). In another alternative, the strut trailing edge 200 of each strut 148 may be downstream of the trailing edge 204 HPC-IV 164, as shown in FIG. 9C (see reference line 210). The orientation of the stator vanes is not limited to the orientations shown in FIGS. 9A-9C. For instance, the orientation of the IV may be different than that shown, the orientation of the OV may be different than that shown, and the orientation of both the IV and OV may be different than that shown. Embedding the strut 148 with the HPC-IV 164 reduces the length of an engine.

In some embodiments, a third axial spacing 212 between the HPC-IV 164 and the first array of HP compressor rotor blades 196 is greater than a fourth axial spacing 214 between the second array of HPC stator vanes 198 and the first array of HPC rotor blades 196. In some embodiments, an increase in axial spacings as described in the present disclosure can mitigate noise reduction, aeromechanical forcing, and stress. In some embodiments, the third axial spacing 212 is substantially equal to the fourth axial spacing 214.

Figure 5:
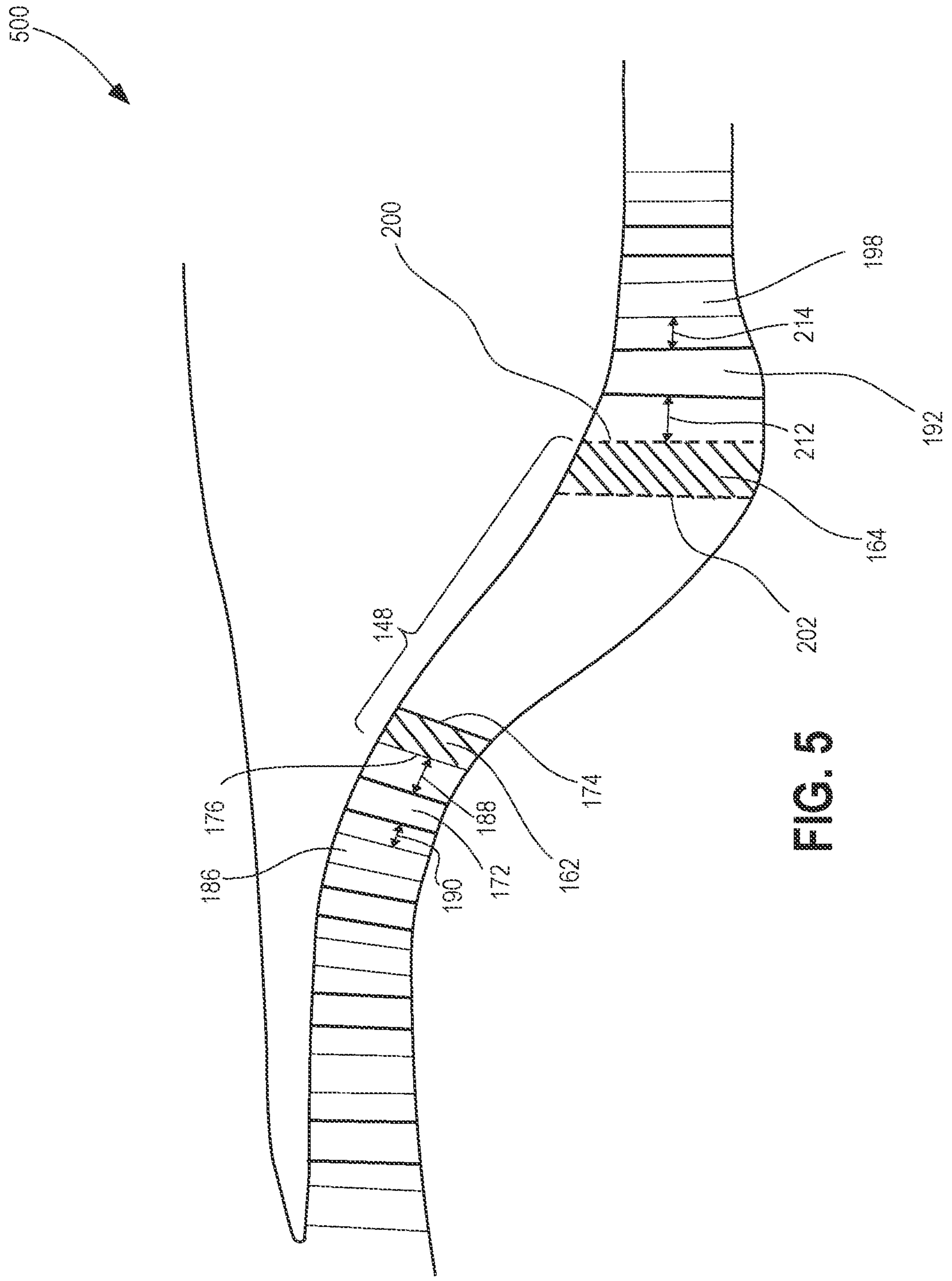
FIG. 5 is an enlarged cross-sectional view of a further annular compressor flow path for use with the gas turbine engine of FIG. 1.

Referring to FIG. 5, there is shown another alternate flow path 218 combining the placement of the LPC-OV 162 and HPC-IV 164, as shown, for example, in FIGS. 9A and 9C. That is, the strut trailing edge 200 of each strut 148 is positioned downstream from the leading edge 202 of the HPC-IV 164. Additionally, a strut leading edge 176 of each strut 148 is positioned upstream from the trailing edge 174 of the LPC-OV 162. Embedding the strut 148 with the LPC-OV 162 and/or the HPC-IV 164 reduces the length of an engine. With this embodiment, the first axial spacing 188 and the second axial spacing 190 may be at least substantially equal. Also, the third axial spacing 212 and the fourth axial spacing 214 may be at least substantially equal. Increasing this axial spacing mitigates engine noise, aeromechanical forcing, and stress.

Figure 6:
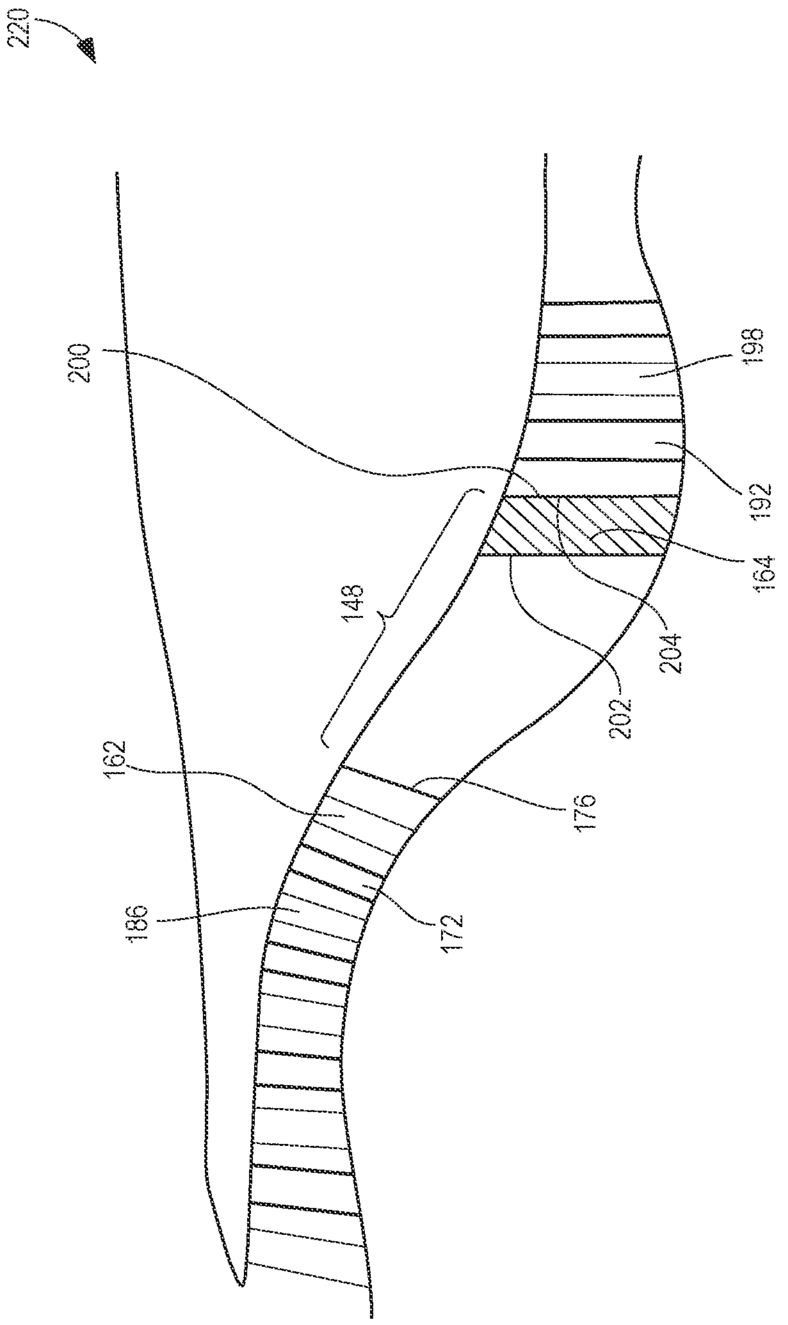
FIG. 6 is an enlarged cross-sectional view of an even further compressor flow path for use with the gas turbine engine of FIG. 1.

As seen in FIG. 6, there is shown another alternate flow path 220 with the strut leading edge 176 of each strut 148 is positioned downstream from the LPC-OV 162. The HPC-IV 164 is positioned upstream from the first array of HPC rotor blades 192. The strut trailing edge 200 of each strut 148 may be positioned relative to the leading edge 202 and the trailing edge 204 of each of the HPC-IV 164, as shown in any one of FIGS. 9A-9C. Embedding the strut 148 with the HPC-OV 164 reduces the length of an engine. In some embodiments, the axial spacing between (1) the strut leading edge 176 and LPC-OV 162, (2) the LPC-OV 162 and the most downstream array of LPC rotor blades 172, and (3) the second to last array of LPC stator vanes 186 and the most downstream array of LPC rotor blades 172 are all at least substantially equal. In yet some embodiments, the axial spacing between (1) the HPC-IV 164 and the first array of HPC rotor blades 192 and (2) the second array of HPC stator vanes 198 and the first array of HPC rotor blades 192 are both at least substantially equal. Increasing this axial spacing mitigates engine noise, aeromechanical forcing, and stress.

Figure 7:
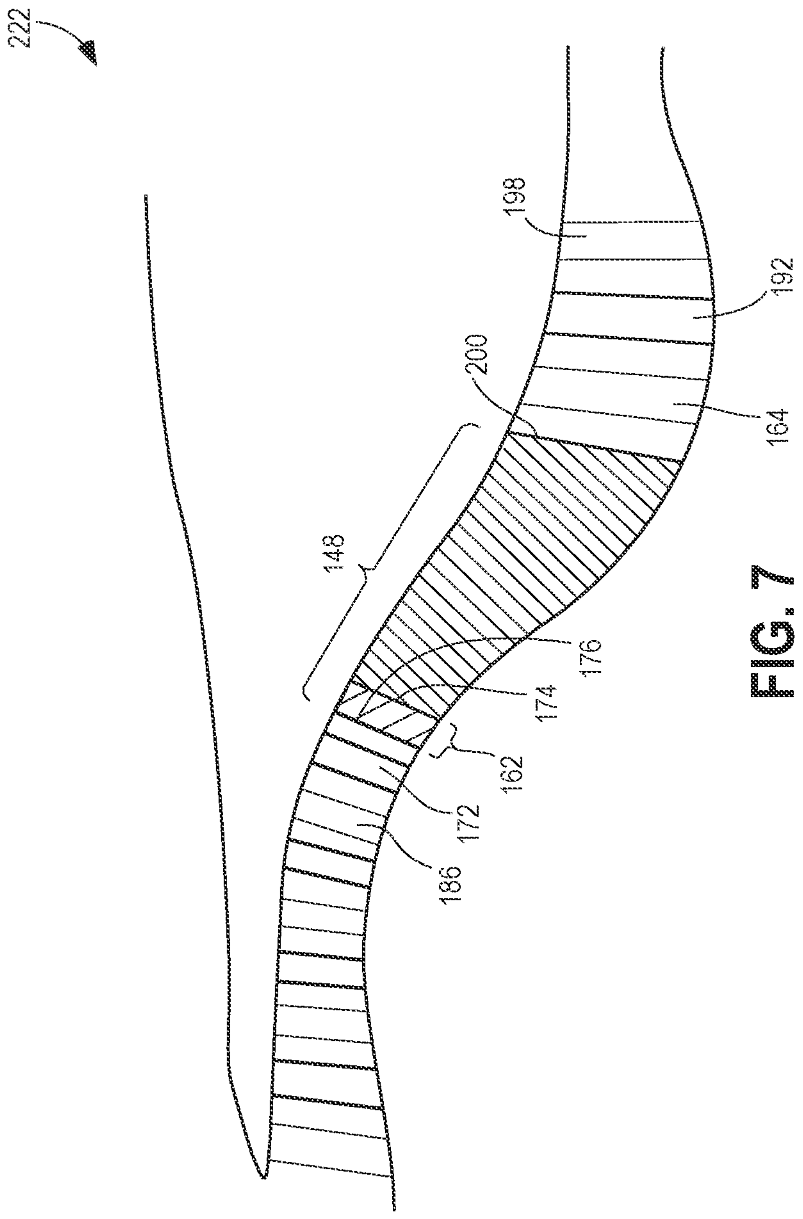
FIG. 7 is an enlarged cross-sectional view of an even further annular compressor flow path for use with the gas turbine engine of FIG. 1.

With reference to FIG. 7, there is illustrated another alternate flow path 222 with the strut leading edge 176 of each strut 148 positioned upstream from the trailing edge 174 of the LPC-OV 162. Further, the strut trailing edge 200 of each strut 148 is positioned upstream from the HPC-IV 164. Embedding the strut 148 with the LPC-OV 162 reduces the length of an engine. In some embodiments, the axial spacing between (1) the LPC-OV 162 and the most downstream array of LPC rotor blades 172 and (2) the second most array of LPC stator vanes 186 and the most downstream array of LPC rotor blades 172 are both at least substantially equal. In some embodiments, the axial spacing between (1) the strut trailing edge 200 of each strut 148 and the HPC-IV 164, (2) the HPC-IV 164 and the first downstream array of HPC rotor blades 192, and (3) the first downstream array of HPC rotor blades 192 and second downstream array of HPC stator vanes 198 are at least substantially equal. Increasing this axial spacing mitigates engine noise, aeromechanical forcing, and stress.

Figure 8B:
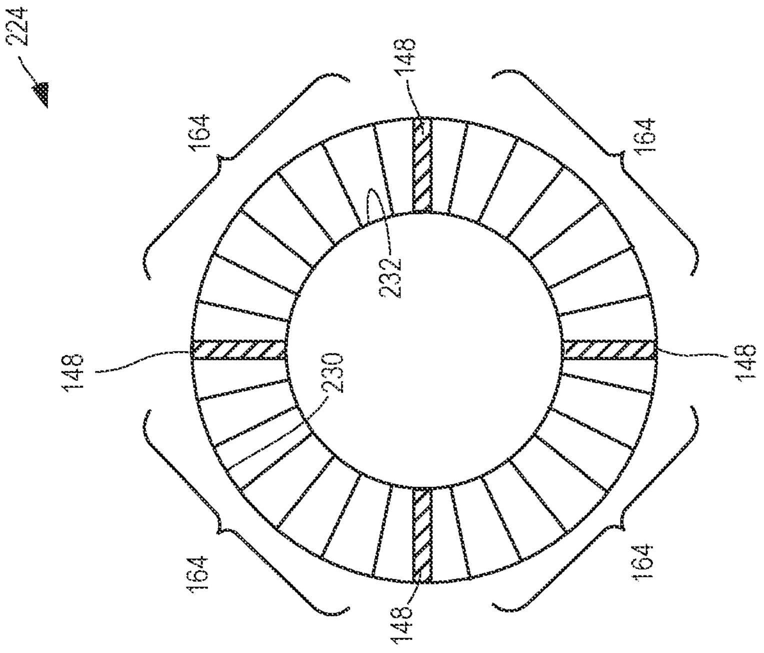
FIG. 8B is an upstream view of a portion of an annular compressor flow path showing struts and inlet guide vanes of an exemplary annular compressor flow path for use with the gas turbine engine of FIG. 1.
Figure 8A:
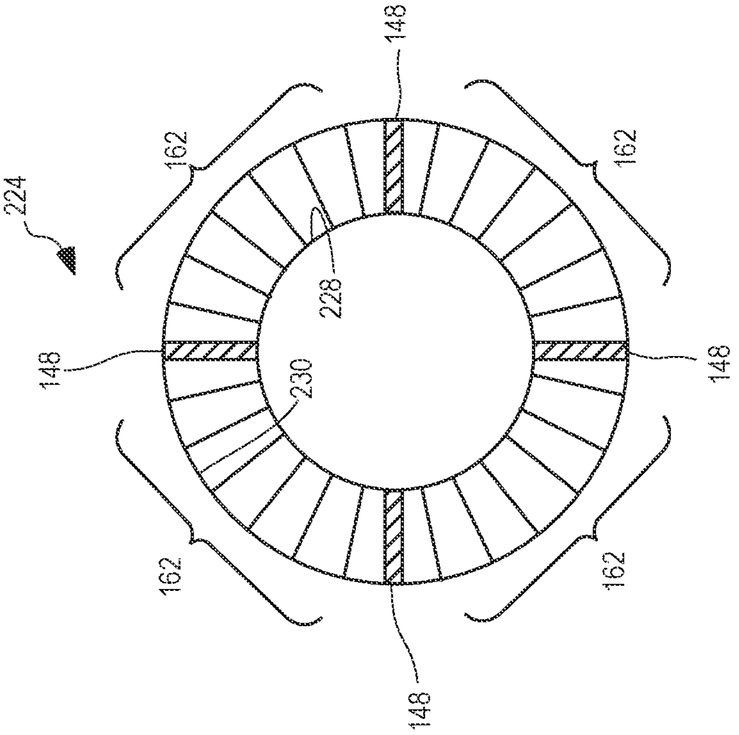
FIG. 8A is a downstream view of a portion of an annular compressor flow path showing struts and outlet guide vanes for use with the gas turbine engine of FIG. 1.

FIGS. 8A and 8B are views shown in the axial direction. The locations in FIG. 2 of these views are only indicated to be a general location. More specifically, FIG. 8A is a downstream view of a portion of an exemplary annular compressor flow path 224 showing the struts 148 and the LPC-OV 162. The LPC-OV 162 includes an inner flow path surface 228 on the forward end 160 of the LP shaft 128 and an outer flow path surface 230 on the inner casing 105, which also support the LPC-OV 162.

FIG. 8B is an upstream view of a portion of the annular compressor flow path 224 showing the struts 148 and the HPC-IV 164. In some embodiments, the HPC-IV 164 includes an inner flow path surface on the HP shaft 130 and an outer flow path surface 230 on the inner casing 105, which also supports the HPC-IV 164.

In some embodiments, a thickness of the strut 148 is greater than that of the LPC-OV and/or HPC-IV. It is understood that the figures described herein are illustrative non-limiting examples and that the shapes and/or number of struts, stator vanes, and/or rotor blades are not limited to the shapes and/or number of struts, stator vanes, and/or rotor blades shown. Additionally, the chord length of the LPC-OV and HPC-IV shown in FIGS. 9A-9C are the same. However, the chord length may vary between each vane of the LPC-OV and/or each vane of the HPC-IV and/or can vary between the LPC-OV and the HPC-IV.

Figure 10A:
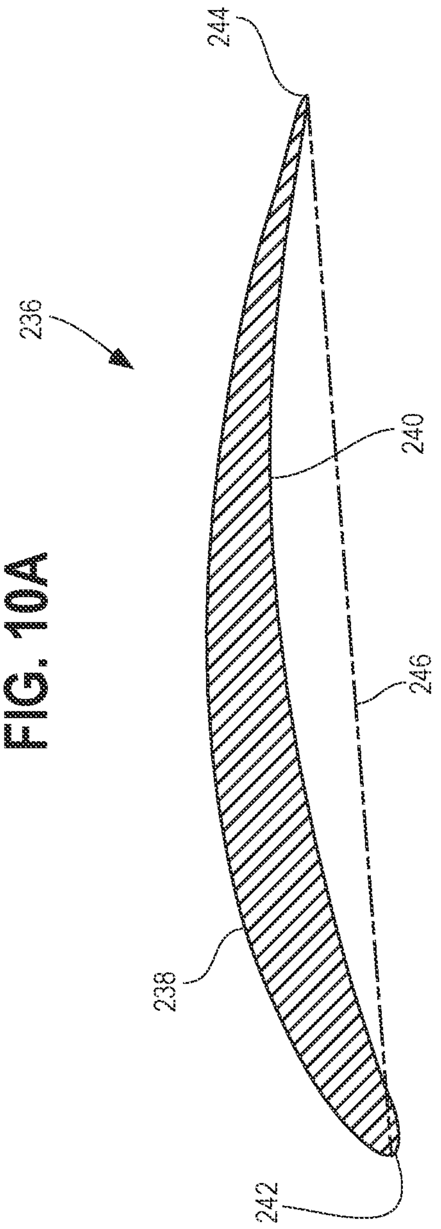
FIG. 10A is a cross-sectional view of a guide vane for use with the gas turbine engine of FIG. 1.

FIG. 10A illustrates an exemplary guide vane 236 that may represent one or both the LPC-OV and HPC-IV. The guide vane 236 includes a top surface 238 and a bottom surface 240 joined at a leading edge 242 and a trailing edge 244. A chord line 246 extends between the leading edge 242 and the trailing edge 244.

Figure 10B:
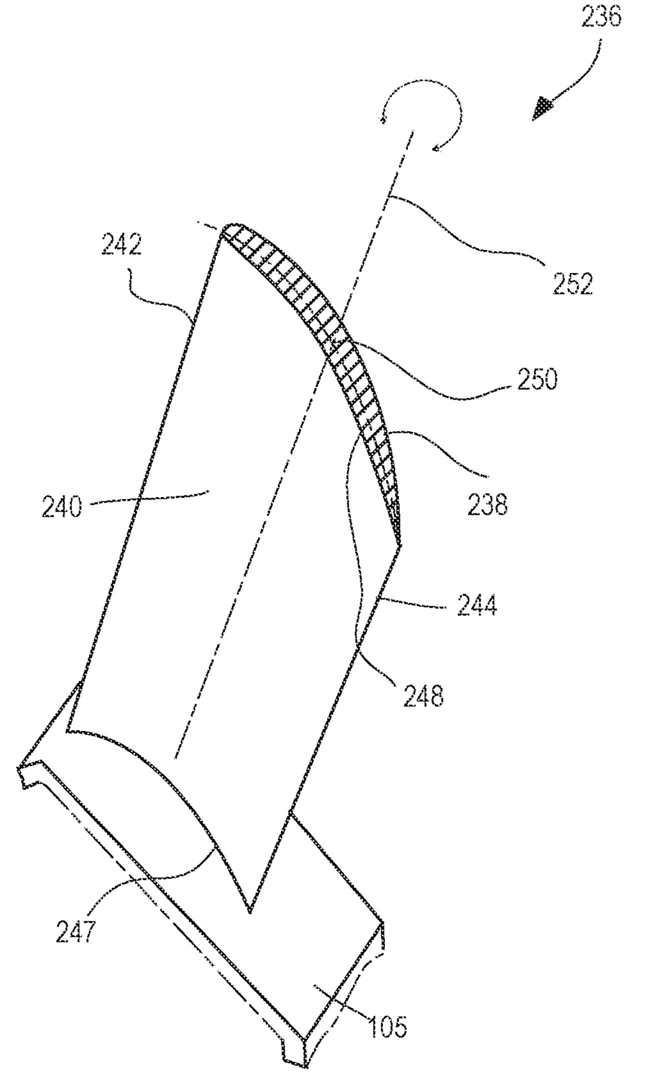
FIG. 10B is a perspective view illustrating a guide vane stacking axis.

FIG. 10B illustrates a stacking axis of the guide vane 236 of FIG. 10A. As shown in FIG. 10B, the top and bottom surfaces 238, 240 extend radially outward from an inner base 247 to an outer end (not shown). The cross-section shown in FIG. 10A is normal to top and bottom surfaces 238, 240. A mid-line 248 is shown extending from the leading edge 242 to the trailing edge 244 that divides the guide vane 236 in half. A stacking point 250 is defined substantially halfway between the leading edge 242 and the trailing edge 244 along the mid-line 248. A stacking axis 252 extends along a line formed through the stacking points 250 along a length of the guide vane 236 from the inner base 247 at the inner casing 105 to the outer end of the guide vane 236.

As illustrated in FIGS. 10A-B, the guide vane 236 has an airfoil cross-sectional shape. This shape may be applied to all the vanes and blades. While the guide vane 236 shown in FIG. 10B is linear (i.e., has a constant chord length along its length), the guide vane 236 also may have a chord length that varies in some regard along its length. In some embodiments, the guide vane 236 leading edge and trailing edge metal angle varies in radial direction. In yet some embodiments, the guide vane 236 may have a radial stacking that is not linear in the axial and circumferential directions (e.g., bow, lean, sweep, and/or dihedral stacking). In some embodiments, each or at least one of the LPC-OV and/or each or at least one of HPC-IV is independently and/or as a group movable, variable, and/or rotatable to change corresponding vane angle. In some embodiments, each LPC-OV and/or HPC-IV is fixed against adjustment.

With reference to FIGS. 9A-9C, the struts 148 may be asymmetrical along a longitudinal central axis that is parallel to the leading edge 176 and the trailing edge 200 to reduce separation of flow moving across them. The improvement derives from a better alignment of surfaces of the struts 148 with angles and surfaces of adjacent stator vanes (e.g., stator vanes 162) than if the struts were symmetrical. More specifically, the surfaces of the struts 148 adjacent the 176 leading edge and the trailing edge 200 can be aligned better with the flow direction when the struts 148 are asymmetrical.

Figure 11:
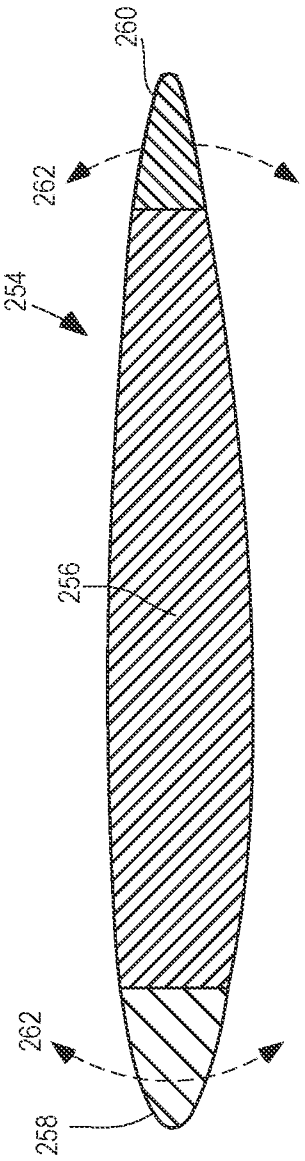
FIG. 11 is a cross-sectional view of a strut for use with the gas turbine engine of FIG. 1.

FIG. 11 illustrates an exemplary strut 254 that includes a main strut portion 256 interconnecting a leading edge portion 258 and a trailing edge portion 260. In some embodiments, one or both of the leading edge portion 258 and the trailing edge portion 260 may be variably and/or controllably movable (e.g., as indicated by reference number 262). This enables better alignment of surfaces of the strut 254 with angles and surfaces of adjacent stator vanes (e.g., stator vanes 162) to reduce separation of flow across it, as with the asymmetrical strut discussed above. Alternatively, in some embodiments, both the leading edge portion 258 and the trailing edge portion 260 are fixed relative to the main strut portion 256. Also, the leading edge portion 258 and/or the trailing edge portion 260 that are movable may be used with the LPC-OV 162 and/or HPC-IV 164.

Figure 12:
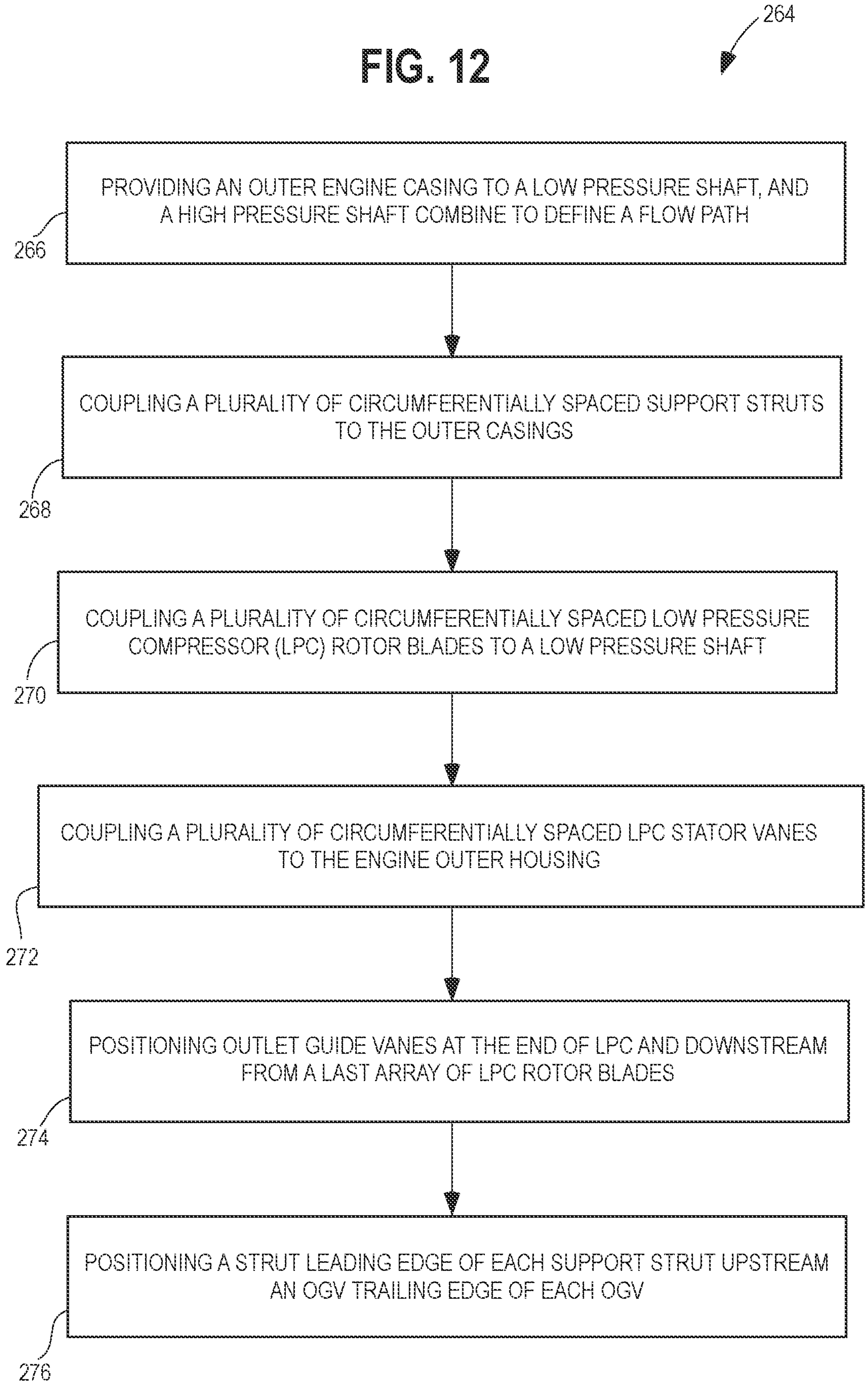
FIG. 12 is an exemplary method of assembling a portion of a gas turbine engine in accordance with some embodiments.
Figure 13:
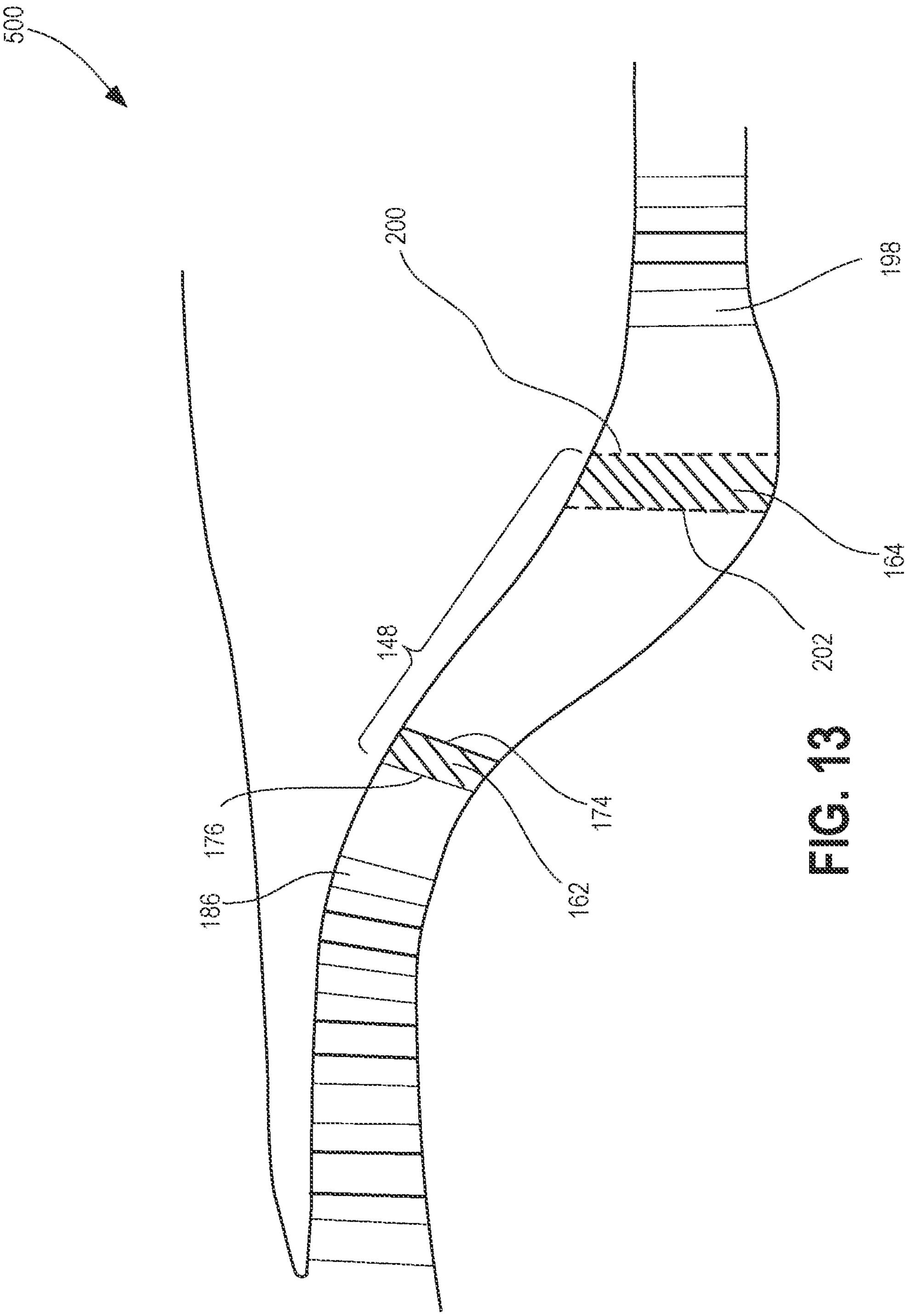

Referring to FIG. 12, there is an exemplary method 264 of assembling a portion of gas turbine engine in accordance with some embodiments. For example, the method 264 and/or one or more of the steps of the method 264 are applicable to one or more of the foregoing designs. The method 264 includes a step of providing an outer engine casing 266, a low-pressure shaft, and a high-pressure shaft that combine to define an annular flow path. The method further includes the step of coupling a plurality of circumferentially spaced struts to the outer casing to support the outer casing 268. In addition, the method includes the step 270 of coupling a plurality of circumferentially spaced low-pressure compressor rotor blades to the low-pressure shaft be rotated by the low-pressure shaft and the step of coupling a plurality of circumferentially spaced low-pressure stator vanes to the outer casing 272. The method further includes the step of positioning a row of outlet guide vanes at the end of the low-pressure compressor section and downstream from a last array of low-pressure rotor blades 274. Moreover, the method includes a step of positioning a strut leading edge of each strut upstream from the trailing edges of the outlet guide vanes 276.

In some configurations, the method 264 may include the step of coupling a plurality of circumferentially spaced high-pressure compressor stator vanes within the flow path. The high-pressure compressor stator vanes may include a first high-pressure compressor stator stage (an array of inlet guide vanes). The method 264 may include positioning a strut trailing edge of each strut downstream from leading edges of the inlet guide vanes.

Further, the method 264 may include coupling a plurality of circumferentially spaced high-pressure compressor stator vanes within the compressor flow path. In some embodiments, the plurality of circumferentially spaced high-pressure compressor stator vanes may be coupled to include a first high-pressure compressor stator and a second high-pressure compressor stator stage. The first high-pressure stator stage may be an annular array of inlet guide vanes. The second high-pressure compressor stator stage may include an annular array of stator vanes. In some embodiments, the method 264 may include positioning a strut trailing edge of each strut upstream from the inlet guide vanes and positioning the inlet guide vanes upstream from the first array of high-pressure compressor rotor blades. The method 264 may include positioning the first array of high-pressure rotor blades upstream from the second row of high-pressure compressor stator vanes. Each corresponding axial spacing (1) between the strut trailing edge of each strut and the row of inlet guide vanes IVs, (2) between the row of inlet guide vanes and the first array of high-pressure compressor rotor blades, and (3) between the first array of high-pressure compressor rotor blades and the row of high-pressure compressor stator vanes may be at least substantially equal.

Although the foregoing designs include only a single LPC stator stage and/or a single HPC stator stage, those skilled in the art would understand from this disclosure that two or more LPC stator stages and/or two or more HPC stator stages can also be positioned similarly. Furthermore, the present disclosure may be applicable to various configurations when upstream stator vanes (e.g., LP-OV), struts, and/or downstream stator vanes (e.g., HP-IV) are involved regardless of the other upstream and/or downstream components. In a non-limiting example, the upstream component may be a fan and the downstream component may be a low-pressure compressor. In such an example, the present disclosure may be applicable to a fan, LPC-OV, strut, and low-pressure compressor inlet guide vanes configuration. In another example, there may be no upstream component involved. In such an example, the present disclosure may be applicable to the strut and the downstream compressor inlet guide vanes configuration. In another example, there may be upstream stator vanes and no upstream compression component. In such an example, the present disclosure may be applicable to the upstream stator vanes, strut, and the downstream compressor inlet guide vanes configuration.

Further, there may be two stator vane arrays back-to-back (i.e., without at any intervening other components, such as rotor components). For example, with reference to FIG. 3, the LPC-OV 162 and the LPC stator vanes 170 immediately upstream from it may not be separated by the rotor blade array 172. In another example, with reference to FIG. 4, HPC-IV 164 and the stator vane array 194 immediately downstream from it may not be separated by the rotor blade array 196.

Further aspects of the present disclosure are provided by the subject matter of the following clauses.

There is provided a gas turbine engine having a casing defining at least a portion of a flow path; at least one stator vane array disposed within the flow path, the at least one stator vane array having outlet vanes, and the outlet vanes each having an outlet vane trailing edge; and at least one strut having a strut leading edge, the strut leading edge being upstream from the outlet vane trailing edges.

The gas turbine engine of the preceding clause may further include the at least one stator vane array having a first stator vane array downstream of a second stator vane array, the first stator vane array having the outlet vanes, the second stator vane array having guide vanes, the guide vanes each having a guide vane trailing edge, and the strut leading edge being upstream of each guide vane trailing edge.

The gas turbine engine of one or more of the preceding clauses may further include at least one rotor blade array disposed within the flow path; the at least one stator vane array having a first stator vane array downstream from a second stator vane array, the first stator vane array having the outlet vanes; the outlet vanes being downstream from the at least one rotor blade array and the second stator vane array; and the at least one rotor blade array being upstream of the strut leading edge.

The gas turbine engine of one or more of the preceding clauses may further include the outlet vanes each having an outlet vane leading edge, and the strut leading edges being upstream of each outlet vane leading edge.

The gas turbine engine of one or more of the preceding clauses may further include that the at least one stator vane array have a first stator vane array and a second stator vane array, the first stator vane array having the outlet vanes, the second stator vane array having inlet vanes and being downstream of the first stator vane array, the inlet vanes each having an inlet vane leading edge, and the strut trailing edge being downstream from each inlet vane leading edge.

The gas turbine engine of one or more of the preceding clauses may also include that the inlet vanes each have an inlet vane trailing edge, and the strut trailing edges being downstream from each inlet vane trailing edge.

The gas turbine engine of one or more of the preceding clauses also may include that the at least one strut has a main portion between a leading edge portion and a trailing edge portion, and at least one of the leading edge portion and the trailing edge portion being movable.

The gas turbine engine of one or more of the preceding clauses may further include at least one rotor blade array and wherein the at least one stator vane array comprises a first stator vane array downstream of a second stator vane array, the at least one rotor blade array being between the first stator vane array and the second stator vane array, a first axial spacing between the first stator vane array and the at least one rotor blade array being greater than a second axial spacing between the second stator vane array and the at least one rotor blade array.

The gas turbine engine of one or more of the preceding clauses also may have at least one rotor blade array and wherein the at least one stator vane array comprises a first stator vane array downstream of a second stator vane array, the at least one rotor blade array being between the first stator vane array and the second stator vane array, a first axial spacing between the first stator vane array and the at least one rotor blade array is at least substantially equal to a second axial spacing between the second stator vane array and the at least one rotor blade array.

The gas turbine engine of one or more of the preceding clauses may further include that the at least one stator vane array comprises a first stator vane array, a second stator vane array, and a third stator vane array, the first stator vane array having the outlet vanes, the second stator vane array being downstream of the first stator vane array, the third stator vane array being downstream of the second stator vane array, at least one rotor blade array being between the second stator vane array and the third stator vane array, axial distances between the at least one strut and the second stator vane array, the at least one rotor blade array and the second stator vane array, and the at least one rotor blade array and the third stator vane array being at least substantially equal.

There is further provided a gas turbine engine comprising: an outer casing defining at least in part a flow path; at least one stator vane array within the flow path, the at least one stator vane array including inlet vanes, and the inlet vanes each having an inlet vane leading edge; and at least one strut having a strut trailing edge downstream from each inlet vane leading edge.

The gas turbine engine of one or more of the preceding clauses may further include at least one rotor blade array in the flow path, and the inlet vanes being upstream of the at least one rotor blade array.

The gas turbine engine of one or more of the preceding clauses may also include that the inlet vanes each includes an inlet vane trailing edge, and the strut trailing edge being downstream of each inlet vane trailing edges.

The gas turbine engine of one or more of the preceding clauses may further include that the at least one stator vane array comprises a first stator vane array and a second stator vane array, the first stator vane array being downstream of the second stator vane array and having the inlet vanes, the second stator vane array having outlet vanes, each outlet vane having an outlet vane trailing edge, and the at least one strut having a strut leading edge upstream of each outlet vane trailing edges.

The gas turbine engine of one or more of the preceding clauses may further include that the outlet vanes each comprise an outlet vane leading edge, and the strut leading edge being upstream of each outlet vane leading edge.

The gas turbine engine of one or more of the preceding clauses may further have at least one rotor blade array and wherein the at least one stator vane array comprises a first stator vane array and a second stator vane array, the second stator vane array being downstream of the first stator vane array, the at least one rotor blade array being between the first stator vane array and the second stator vane array, a first axial spacing between the first stator vane array and the at least one rotor blade array being greater than a second axial spacing between the at least one rotor blade array and the second stator vane array.

The gas turbine engine of one or more of the preceding clauses may further have at least one rotor blade array and wherein the at least one stator vane array comprises a first stator vane array and a second stator vane array, the second stator vane array being downstream of the first stator vane array, the at least one rotor blade array being between the first stator vane array and the second stator vane array, a first axial spacing between the first stator vane array and the at least one rotor blade array being substantially equal to a second axial spacing between the at least one rotor blade array and the second stator vane array.

The gas turbine engine of one or more of the preceding clauses also may include that the inlet vanes are variable in stagger angle.

There is provided method of assembling a gas turbine engine comprising: combining a casing and a shaft to define at least in part an annular flow path; coupling a first stator vane array to the outer casing in the annular flow path, the first stator vane array having outlet vanes with outlet vane trailing edges; coupling a second stator vane array to the casing in the annular flow path, the second stator vane array having inlet vanes with inlet vane leading edges; and coupling at least one strut to the casing, the at least one strut having a strut leading edge and a strut trailing edge, the strut leading edge being upstream of the each outlet vane trailing edge and/or the strut trailing edge being downstream of each inlet vane trailing edge.

There is further provided a gas turbine engine comprising: a casing defining at least a portion of a flow path, a first stator vane array disposed in the flow path and including outlet vanes, the outlet vanes each having an outlet vane trailing edge: a second stator vane array disposed in the flow path and including inlet vanes, and the inlet vanes each having an inlet vane leading edge; and at least one strut having a strut leading edge and a strait trailing edge, the strut leading edge being upstream from each outlet vane trailing edge and/or the strut trailing edge being downstream from each outlet vane leading edge.

The gas turbine engine of one or more of the preceding clauses also may include the strut leading edge being upstream from each outlet vane trailing edge and the strut trailing edge being downstream from each outlet vane leading edge.

It will be understood that various changes in the details, materials, and arrangements of parts and components which have been herein described and illustrated to explain the nature of the disclosure may be made by those skilled in the art within the principle and scope of the appended claims. Furthermore, while various features have been described with regard to particular embodiments, it will be appreciated that features described for one embodiment also may be incorporated with the other described embodiments.

What is claimed is:

1. A gas turbine engine comprising:
a casing defining at least a portion of a flow path;
at least one stator vane array of a low-pressure compressor disposed within the flow path, the at least one stator vane array having a first stator vane array and a second stator vane array, the first stator vane array being downstream from the second stator vane array, the first stator vane array and the second stator vane array being back-to-back in series, the first stator vane array having outlet vanes, and the outlet vanes each having an outlet vane trailing edge; and
at least one strut having a strut leading edge, the strut leading edge being upstream from the outlet vane trailing edges.

2. The gas turbine engine of claim 1, further comprising:
at least one rotor blade array of the low-pressure compressor disposed within the flow path;
the outlet vanes being downstream from the at least one rotor blade array and the second stator vane array; and
the at least one rotor blade array being upstream of the strut leading edge.

3. The gas turbine engine of claim 1, wherein the outlet vanes each have an outlet vane leading edge, and the strut leading edges being upstream of each outlet vane leading edge.

4. The gas turbine engine of claim 1, wherein the at least one stator vane array comprises a third stator vane array, the third stator vane array having inlet vanes and being downstream of the first stator vane array, the inlet vanes each having an inlet vane leading edge, and the at least one strut having a strut trailing edge being downstream from each inlet vane leading edge.

5. The gas turbine engine of claim 4, wherein the inlet vanes each have an inlet vane trailing edge, and the strut trailing edges being downstream from each inlet vane trailing edge.

6. The gas turbine engine of claim 1, wherein the at least one strut has a main portion between a leading edge portion and a trailing edge portion, and at least one of the leading edge portion and the trailing edge portion being movable.

7. The gas turbine engine of claim 1, wherein the at least one stator vane array comprises a first stator vane array, a third stator vane array, and a fourth stator vane array, the first stator vane array having the outlet vanes, the third stator vane array being downstream of the first stator vane array, the fourth stator vane array being downstream of the third stator vane array, at least one rotor blade array being between the third stator vane array and the fourth stator vane array, axial distances between the at least one strut and the third stator vane array, the at least one rotor blade array and the third stator vane array, and the at least one rotor blade array and the fourth stator vane array being at least substantially equal.

8. A gas turbine engine comprising:

an outer casing defining at least in part a flow path;

at least one stator vane array of a high-pressure compressor within the flow path, the at least one stator vane array including a third stator vane array and a fourth stator vane array, the third stator vane array and the fourth stator vane array being back-to-back in series, the third stator vane including inlet vanes, and the inlet vanes each having an inlet vane leading edge; and at least one strut having a strut trailing edge downstream from each inlet vane leading edge.

9. The gas turbine engine of claim 8, further comprising at least one rotor blade array in the flow path, and the third stator array and the fourth stator array being upstream of the at least one rotor blade array.

10. The gas turbine engine of claim 8, wherein the inlet vanes each includes an inlet vane trailing edge, and the strut trailing edge being downstream of each inlet vane trailing edges.

11. The gas turbine engine of claim 8, wherein the at least one stator vane array comprises a first stator vane array, the first stator vane array being upstream of the third stator vane array and having outlet vanes, each outlet vane having an outlet vane trailing edge, and the at least one strut having a strut leading edge upstream of each outlet vane trailing edges.

12. The gas turbine engine of claim 11, wherein the outlet vanes each comprise an outlet vane leading edge, and the strut leading edge being upstream of each outlet vane leading edge.

* * * * *